United States Patent Office 2,854,857
Patented Oct. 7, 1958

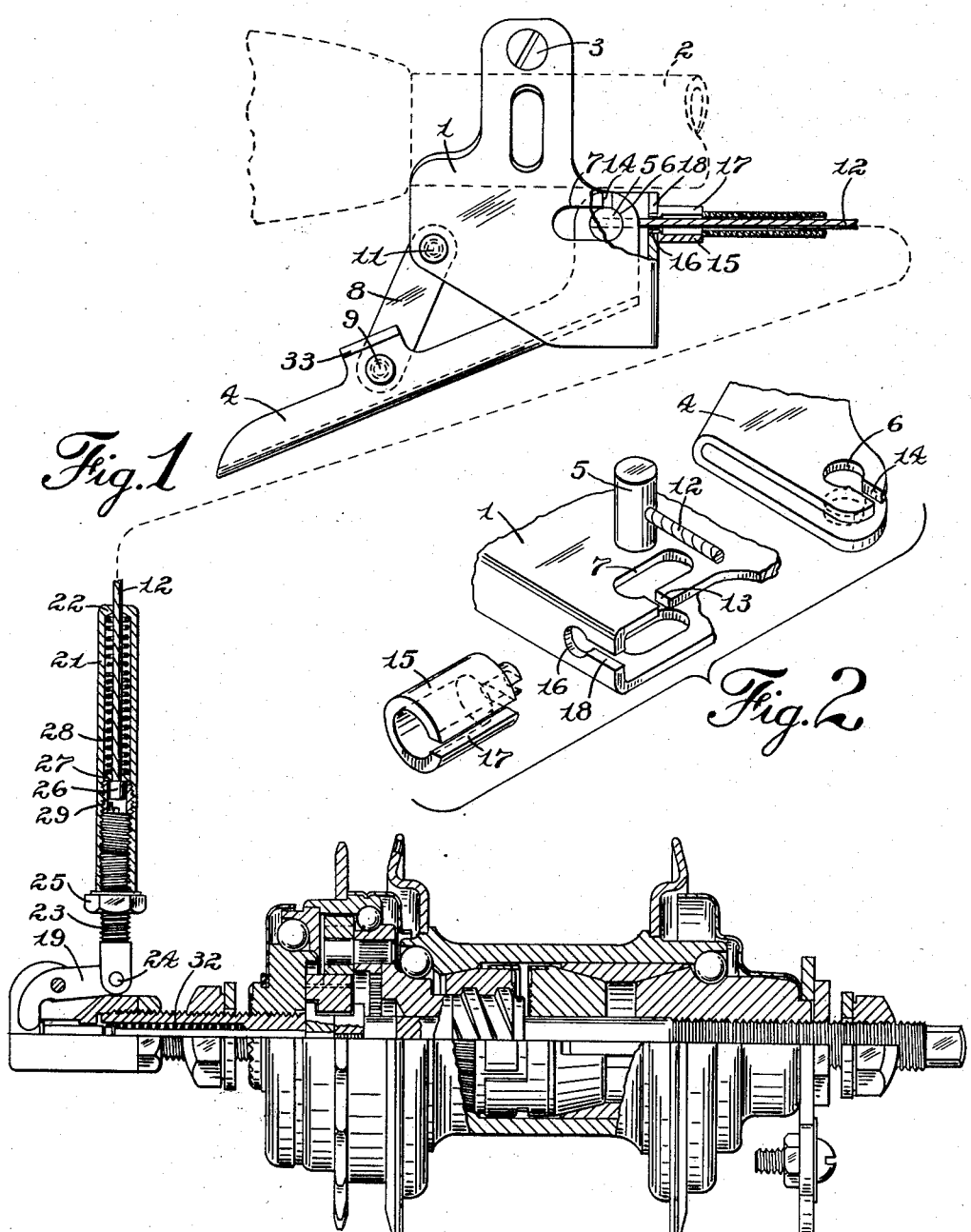

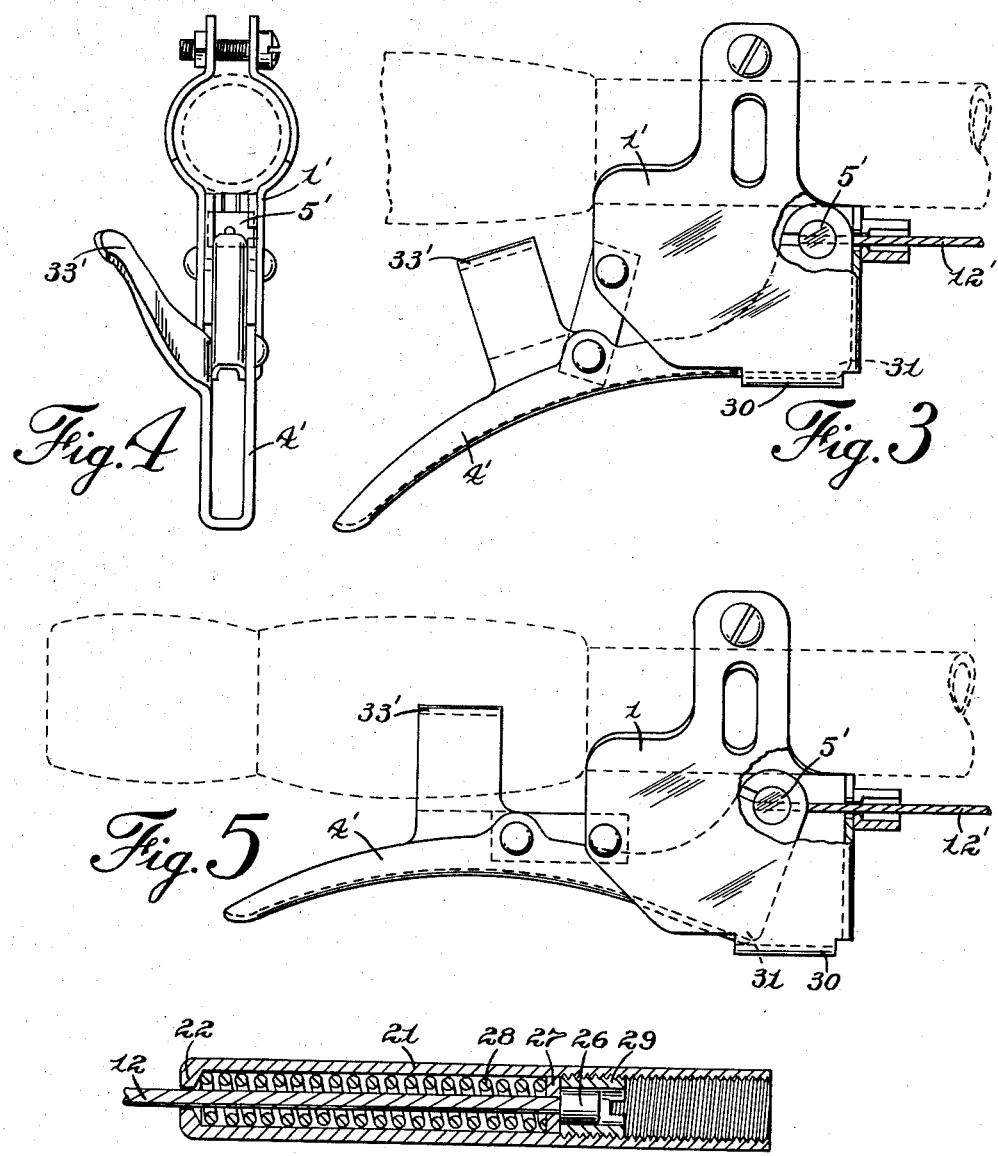

2,854,857

FLEXIBLE REMOTE ACTUATING MEANS FOR A TWO-SPEED COASTER BRAKE

Hollis K. Gleasman, Elmira, and Kenneth Donald Aumick, Pine City, N. Y., assignors to Bendix Aviation Corporation, Elmira Heights, N. Y., a corporation of Delaware Application May 3, 1954, Serial No. 427,192

6 Claims. (Cl. 74—489)

The present invention relates to a flexible remote actuating means for a two-speed coaster brake and more particularly a manual operating means adapted to be mounted on the handle bar of a bicycle, and a cable and lever connection actuated thereby for shifting the gearing in the rear hub of the bicycle.

It is an object of the present invention to provide a novel device of this character which operates positively with very little manual effort, is simple and economical in construction, and is readily adaptable to a wide variety of installations.

It is another object to provide such a device which is so constructed as to remain in either shifted position without the necessity of additional manually operated detents, latches etc.

Further objects and advantages will be apparent from the following description taken in connection with the accompanying drawing in which:

Fig. 1 is a side elevation of a preferred embodiment of the invention as used to actuate a two-speed coaster brake of the type illustrated in the patent to Hood 2,609,712, issued September 9, 1952, some of the parts being partly broken away and shown in section;

Fig. 2 is a detail in perspective of portions of the operating handle, bracket and cable attachment shown in disassembled relation;

Fig. 3 is a side elevation of a second embodiment of the cable actuating means;

Fig. 4 is an end view of the same from the left in Fig. 3;

Fig. 5 is a view similar to Fig. 3 showing the parts in the shifted or high gear position; and Fig. 6 is an enlarged sectional detail of the preloaded spring coupling connecting the cable to the gear shifting lever.

In Fig. 1 of the drawing there is illustrated a frame or hollow bracket 1 which is arranged to be clamped on a member such as a handle bar 2 of a bicycle by suitable means such as a bolt 3. An operating handle 4 of channel cross-section is slidably pivoted in the bracket 1 by means of a pin or gudgeon 5 which is rotatably mounted in aligned bearing openings 6 in the handle, and also bears slidably in registering slots 7 (Fig. 2) in the sides of the bracket.

The handle 4 is also connected to the bracket 1 by means of a link 8 which is pivoted to the handle at 9, and to the bracket at 11. The pivot bearings 9 and 11 are so located, and the length of the link 8 is so chosen that when the handle 4 is raised by the operator, the pivot pin 5 is drawn to the left in Fig. 1 substantially to the end of the slot 7 when the link 8 has been swung to its dead-center position. Moreover, when the handle is raised until its motion is stopped by the pivot 11, the pivot 9 will have passed slightly beyond the dead-center position. That is, it will have moved slightly above the position in which the pivots 9, 11 and 5 are in alignment, consequently the handle will be held in this position by tension on the pivot 5 until it is released by the operator.

A flexible operating cable 12 is anchored in any suitable manner to the pin 5 at an intermediate point as shown in Fig. 2, and a slot 13 of sufficient width to receive the cable is formed in one side of the bracket 1 intersecting the slot 7. A similar slot 14 is formed in one side of the handle 4, intersecting the bearing opening 6. A slotted nipple 15 is mounted in an opening 16 in the bracket 1 and secured in any suitable manner with its slot 17 in alignment with a similar slot 18 in the bracket which intersects the opening 16.

In assembling and anchoring the cable to the handle the handle is introduced into the bracket with the openings 6 registering with the slots 7 and the slot 14 registering with the slot 13. The pin 5 is then introduced laterally, with the cable 12 traversing the slots 13 and 14. The pin 5 with its attached cable is then rotated clockwise as viewed from above in Fig. 2, causing the cable to traverse the slot 18 in the bracket and slot 17 in the nipple 15 until the parts occupy the positions shown in Fig. 1.

The opposite end of the cable 12 is anchored to the end of the gear shift lever 19 which corresponds to the lever 34 of the patent to Hood above cited. This anchorage comprises a link mechanism affording convenient adjustment of the overall length of the cable and also a pretensioned coupling which permits the handle 4 to move slightly beyond the position at which the lever 19 has completed its shifting stroke, in order to allow the handle to go through and beyond its dead-center position as above set forth.

For this purpose a tubular coupling member 21 (Fig. 6) is provided having an inturned flange 22 at one end with an opening permitting the cable to slide therethrough. At the opposite end the tube 21 is threaded for a considerable portion of its length to adjustably receive a threaded stud 23 which is pivoted at 24 to the lever 19. A lock nut 25 is preferably employed to maintain the parts in adjusted position.

A cylindrical anchor member 26 is fixed on the end of the cable 12 in any suitable manner, and a thrust ring 27 surrounds the cable 12 in abutting relation to the anchor member 26 and is yieldably pressed by a spring 28 against the end of a hollow nipple 29 which is threaded in the tube 21 and slidably receives the anchor member 26. It will be seen from this that the tension of the cable 12 may be adjusted by threading the nipple 29 in the tube 21 toward or away from the anchored end of the cable.

In the embodiment of the invention shown in Figs. 3, 4, and 5, the parts of the bracket, handle, and cable anchoring mechanism are the same as in the previous embodiment and are similarly numbered. In this case however the pin 5' which serves as the pivotal anchor for the cable 12' does not extend through the sides of the bracket 1', but a guiding function equivalent to that of the slots 7 in Fig. 1 is performed by a bottom wall 30 on the bracket 1' on which a projecting portion 31 of the handle 4' has slidable bearing. The wall 30 is substantially parallel to the cable 12' where it enters the bracket 1' so that the end of the cable is caused to have a substantially rectilinear movement as the handle is raised and lowered.

In the actuation of the two-speed shifting mechanism, the gearing is normally maintained in its low-speed position by virtue of the spring 32 (Fig. 1) corresponding to the spring 31 in the Hood patent cited. When the operator draws the handle 4 upwardly through its dead-center position, the cable 12 swings the lever 19 to move the gearing into its high-speed position where it is maintained by the handle 4, which is held in its upper position by the tension of the cable 12 as above described. To shift back to low gear, the operator merely presses on a thumb rest 33 or 33' on the handle whereupon the spring 32 moves the gear back to its low-speed position.

Although but two embodiments of the invention have been shown and described in detail it will be understood that changes may be made in the precise form and arrangement of the parts without departing from the spirit of the invention.

We claim:

1. In a remotely actuated shifting device for two speed bicycle gearing, a bracket member, means for clamping said member to a support convenient to the operator, an operating handle having one end pivotally and slidably mounted in the bracket and the other end projecting therefrom, a flexible cable entering the bracket and there attached to the handle, a link member pivoted at one end to the bracket and at the other end to an intermediate point of the handle, including further guiding means for the handle in the bracket comprising a wall of said bracket substantially parallel to the cable as it enters the bracket, and said handle having a contoured projection located laterally from the point of attachment of the cable to the handle, and bearing on said wall.

2. In a remotely actuated shifting device for two speed bicycle gearing, a bracket member, means for clamping said member to a support convenient to the operator, an operating handle pivotally and slidably mounted in the bracket and projecting therefrom, a flexible cable entering the bracket and there attached to the handle, and a link member pivoted at one end to the bracket and at the other end to an intermediate point of the handle; including further means for guiding the movement of the handle in the bracket to cause the point of attachment of the cable to the handle to describe a substantially rectilinear path as the handle is swung on said link; and in which the points of pivotal connection of the link to the bracket and the handle are so oriented with the point of attachment of the handle to the cable, that movement of the handle to draw the cable brings said three points into alignment.

3. A shifting device as set forth in claim 2 in which the handle and its pivotal supports are so formed and arranged as to limit the movement of the handle beyond the position where the three points of connection of the link, handle and cable are in alignment.

4. In a remotely actuated shifting device for two speed bicycle gearing, a bracket member, means for clamping said member to a support convenient to the operator, an operating handle pivotally and slidably mounted in the bracket and projecting therefrom, a flexible cable entering the bracket and there attached to the handle, and a link member pivoted at one end to the bracket and at the other end to an intermediate point of the handle; including further a gear shift lever, and means for coupling said cable to the lever including a tube internally threaded at one end and having an inturned flange at its other end with an opening slidably receiving the cable, a stud threaded in the tube pivotally connected to said lever, a nipple adjustably threaded in the tube, a cylindrical terminal member fixed on the end of the cable, slidably seated in said nipple, a thrust washer mounted on the cable adjacent the terminal member and slidable in said tube, and a compression spring surrounding the cable within the tube between said flange and thrust washer.

5. In a remotely actuated shifting device for two speed bicycle gearing, a bracket member, means for clamping said bracket to a support convenient to the operator, an operating handle, means for mounting one end of the handle in the bracket for sliding movement with freedom for pivotal movement about said means, with the other end of the handle projecting from said bracket; a flexible cable entering the bracket and attached to the handle by said mounting means, a link member pivoted at one end to the bracket and at the other end to an intermediate point of the handle, and said mounting means including means for guiding the movement of the end of the handle in the bracket to cause the point of attachment of the cable to the handle to describe a substantially rectilinear path as the handle is swung on said link.

6. In a remotely actuated shifting device for two speed bicycle gearing, a bracket member, means for clamping said member to a support convenient to the operator, an operating handle, means for mounting one end of the handle in the bracket for sliding movement for freedom for pivotal movement about said means, with the other end of the handle projecting from said bracket, a flexible cable entering the bracket and attached to the handle by said mounting means, a link member pivoted at one end to the bracket and at the other end to an intermediate point of the handle; the attachment of the cable to the handle forming a part of said mounting means and comprising a gudgeon journalled in the handle and having the cable anchored at an intermediate point of the gudgeon, said bracket having a pair of slots extending substantially parallel to the cable as it enters the bracket, the ends of said gudgeon extending laterally into said slots and slidably received thereby.

References Cited in the file of this patent

UNITED STATES PATENTS

| 682,536 | Duncanson | Sept. 10, 1901 |
| 2,560,154 | Brown | July 10, 1951 |

FOREIGN PATENTS

| 1,513 | Great Britain | Nov. 22, 1906 |
| 518,932 | Great Britain | Mar. 12, 1940 |
| 649,552 | Great Britain | Jan. 31, 1951 |
| 960,276 | France | Oct. 24, 1949 |
| 458,361 | Italy | July 10, 1950 |